US005556686A

United States Patent [19]

O'Shea

[11] Patent Number: 5,556,686

[45] Date of Patent: Sep. 17, 1996

[54] STREET ADDRESS DISPLAY

[76] Inventor: Christian D. O'Shea, 615 Idlewood Dr., Clarksville, Tenn. 37043

[21] Appl. No.: 309,172

[22] Filed: Sep. 20, 1994

Related U.S. Application Data

[63] Continuation-in-part of Ser. No. 176,538, Jan. 3, 1994, abandoned.

[51] Int. Cl.$^6$ .............................. B32B 3/06; G09F 19/00

[52] U.S. Cl. .............................. 428/99; 40/124.5; 40/200; 40/582; 40/583; 40/592; 40/606; 40/607; 40/612; 40/661; 52/103; 52/104; 248/504; 428/13; 428/913.3

[58] Field of Search .............................. 428/99, 13, 913.3; 40/582, 583, 606, 612, 661, 124.5, 607, 592, 200; 248/504; 52/103, 104

[56] References Cited

U.S. PATENT DOCUMENTS

| | | | |
|---|---|---|---|
| 2,013,377 | 9/1935 | Debs | 40/124.5 |
| 2,548,706 | 4/1951 | Corning | 52/104 |
| 2,597,003 | 5/1952 | Johnson | 40/612 |
| 2,800,099 | 7/1957 | Baker | 40/612 |
| 3,292,291 | 12/1966 | Kelley | 40/592 |
| 5,221,396 | 6/1993 | Kane | 165/250 |

FOREIGN PATENT DOCUMENTS

| | | | |
|---|---|---|---|
| 0001422 | 3/1988 | United Kingdom | 40/582 |

OTHER PUBLICATIONS

"Lorenzum Radium Luminous tile house numbers" by Chas. F. Lorenzen and Co., Sep. 21, 1926.

"Complete House Numbering Kit" by Hyco Products Company, 7370 Nothfield Road, Walden Hills, OH 44146–6106.

"Address–O–Lite" by DIGECON Plastics International, Inc., 3050 Copter Road, Pensacola, Fla. 32514

"Solar Powered Address Light" by Sun–Mate, Product No. 28722.

Numbers that are painted on the curb.

*Primary Examiner*—Nasser Ahmad

*Attorney, Agent, or Firm*—Waddey & Patterson; Arles A. Taylor, Jr.

[57] ABSTRACT

Disclosed herein is a street address display designed to provide easier identification of property. The street address display is especially effective at night. The street address display includes a housing with transparent viewing faces, anchoring platforms attached to the housing, figures, and a background used as a mounting surface for the figures. The figures and the background are of contrasting coloration so that the figures can be seen by day as well as by night. The street address display is designed to be mounted directly to a mounting surface, such as a vehicle entranceway, using an anchoring means. The street address display is mounted on the mounting surface proximate to a roadway so that the street address display can be easily seen by oncoming traffic. The placement of the street address display near an adjacent roadway, along with the low profile of the street address display, allows for the street address display to be readily visible in an automobile's low beam headlights. The housing of the street address display is composed of a durable transparent material, preferably a polycarbonate. In a preferred embodiment of the street address display, the housing is supported by a rib that runs along the internal surface of the housing from one end to the other.

16 Claims, 8 Drawing Sheets

STREET ADDRESS DISPLAY

This is a continuation-in-part of U.S. patent application Ser. No. 08/176,538, filed Jan. 3, 1994, now abandoned.

BACKGROUND OF THE INVENTION

The present invention relates generally to a street address display and more particularly to a street address display that is mounted on a mounting surface proximate to a roadway so as to be visible from a passing car. The street address display of this invention is designed to be visible during the day as well as at night.

It will be appreciated by any driver that it is frustrating to find a roadside street address. This frustration is accentuated at nighttime. Often, the numbering on mailboxes is in poor condition and thus, is illegible. Frequently, the numbering cannot be found at all. Furthermore, mailbox numbers are above the light of an automobile's downward sloping low headlight beam. If the number on the mailbox is in legible form, its location necessitates the use of an automobile's highbeam headlights, which is a safety hazard in the vicinity of other traffic. If the number of the house or property cannot be found, this usually results in very slow and inattentive driving, which constitutes a danger to other nearby traffic.

Additionally, places of business are listed in the phone book and elsewhere by street number. These numbers are often impossible to find, as usually there are no mailboxes in a business district. The few numbers which are shown are displayed erratically and are thus not helpful in identifying the place of business.

In addition their ineffectiveness in communicating the address to a driver, current street address displays do not come in kits which contain all the parts necessary for the consumer to customize and attach the display to his or her property.

What is needed, then, is a street address display that provides clear, highly visible, and unobtrusive identification in a standardized design form. This device is presently lacking in the prior art.

SUMMARY OF THE INVENTION

It is an object of this invention to provide a street address display that is highly visible, yet small and unobtrusive.

A further object of this invention is to provide a street address display which contains reflective letters or numerals that can be identified from a long distance and at nighttime.

It is a further object of this invention to provide a street address display with a housing that provides durable protection of the reflective figures, which allows attachment of the display in an advantageous location such as near the end of a vehicle entranceway.

It is a further object of this invention to provide a street address display with transparent viewing surfaces that are angled toward the oncoming traffic such that the street address can be easily seen.

Yet another object of this invention is to provide a street address display with a low profile relative to a mounting surface so that the display lies within the path of a car's low beam headlights.

Yet another object of this invention is to provide a display of durable construction and with a solid anchor installation system that can withstand damage from everyday normal traffic.

Yet another object of this invention is to provide a kit having all the parts necessary for the consumer to customize and attach the display to his or her property.

DESCRIPTION OF THE PREFERRED EMBODIMENT

Figure 1:
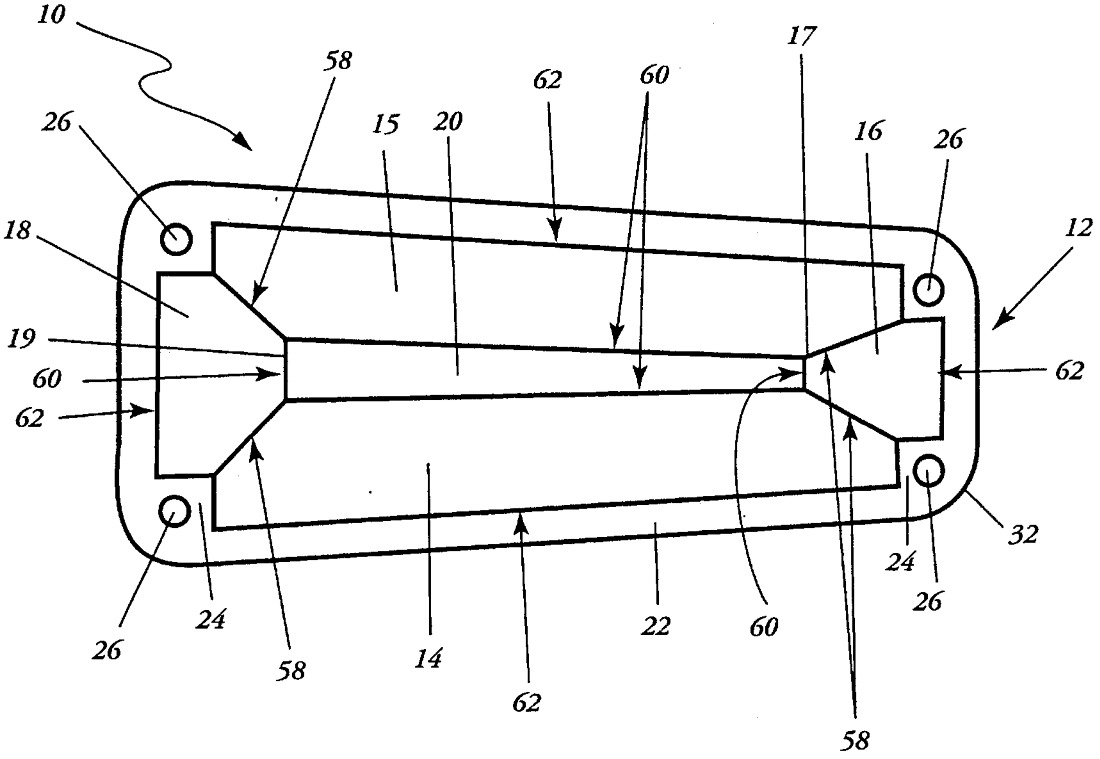
FIG. 1 is a top view of the street address display.

Referring now to the drawings, wherein like numerals represent like parts throughout, a preferred embodiment of the device of the present invention, a street address display, is generally represented by the numeral 10. The street address display 10 is composed of a figure housing 12, which is preferably molded in a single integrated unit, having first and second viewing faces 14,15 connected at their side edges 58 by a second end wall 16 and a first end wall 18. The first and second viewing faces 14,15 and first and second end walls 18,16 connect along their top edges 60 to form the top 20 of the housing 12. The first and second viewing faces 14,15 and first and second end walls 18,16 are connected along their bottom edges 62 to a base 22. The base 22 includes four integral anchor platforms 24. Adjacent to the anchor platforms 24 are anchor platform walls 28. Anchor holes 26 are bored through the respective anchor platforms 24. The base 22 also preferably has rounded comers 32, as best seen in FIG. 1. Preferably, the base 22 will extend horizontally away from each of the bottom edges 62, with the preferred width of the base 22 being 10 mm. The preferred length of the base 22 along the bottom edge 62 of the first and second viewing faces 14,15 is approximately 29 cm. The preferred length of the base 22 along the bottom edge 62 of the first end wall 18 is approximately 12 cm and the preferred length of the base 22 along the second end wall 16 is approximately 11 cm. The preferred thickness of the base 22 is 7 mm. These measurements are not critical and can be altered if necessary.

Figure 2:
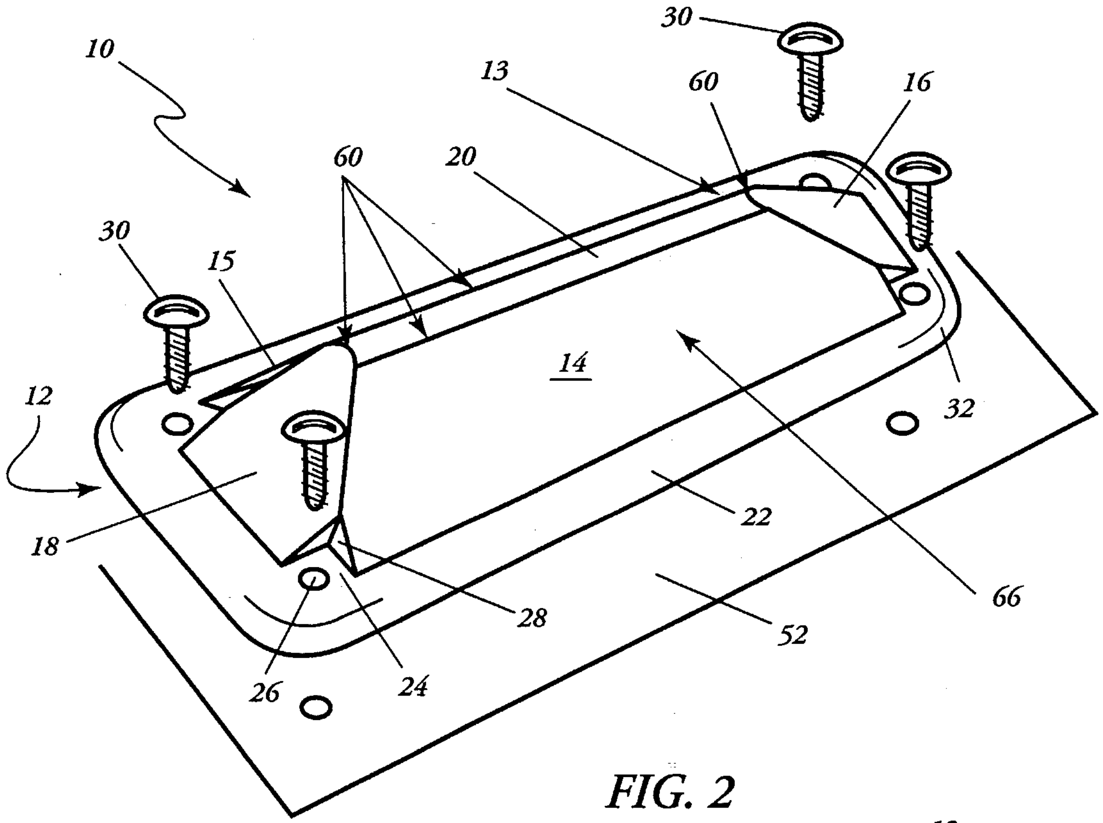
FIG. 2 is an exploded perspective view of the street address display including anchoring means.
Figure 4:
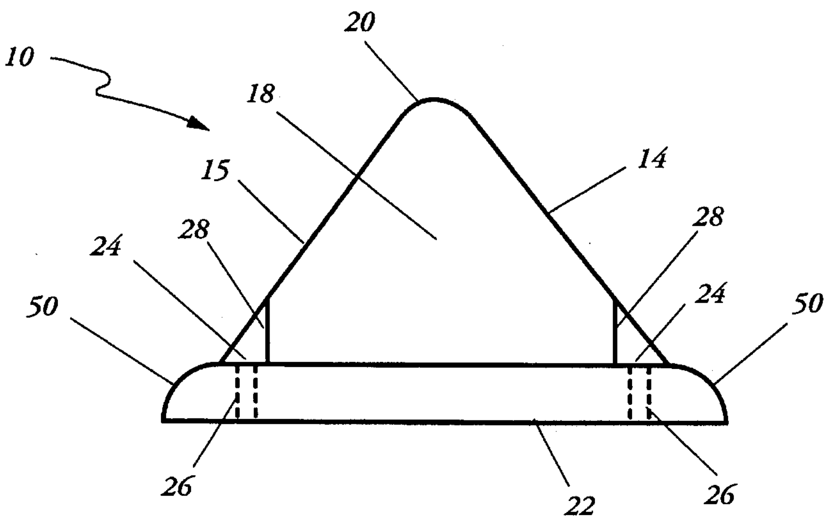
FIG. 4 is a first end wall side view of the street address display.

As best seen in FIGS. 2 & 4, the first and second viewing faces 14,15, which preferably are of identical size and shape, are angled inward at a preferred angle of between 30°–60° as they extend upward from the base 22 to the top 20 of the housing 12. The first and second viewing faces 14,15 are tapered to angle inward between 1°–12°, with the preferred angle being 3°, from the first end wall 18 to the second end wall 16. (FIG. 1) In the preferred embodiment of the invention, first and second viewing faces 14,15 are transparent.

As best seen in FIGS. 2 and 4, the top edges 60 of first and second first and second viewing faces 14,15 and first and second end walls 18,16 are preferably rounded off at the top 20 of the figure housing 12 to define a rounded top 20 having a width of approximately 7 mm near second end wall 16. As top 20 extends from second end wall 16 towards first end wall 18, it flares between 1°–12°, with the preferred angle being 3°, from a center line of the top 20. (FIG. 1)

The second end wall 16 extends upward and inward from base 22 to the narrow end 17 of top 20. (FIG. 1) First and second end walls 18, 16 preferably have a thickness of at least 3 mm. The first end wall 18 also extends upward and inward from base 22 to the wide end 19 of the top 20. (FIG. 1) Because of the angled position of the first and second viewing faces 14, 15, the first end wall 18 is wider and larger in surface area than second end wall 16.

As seen in FIG. 2, anchor platform walls 28 preferably extend from base vertically and surround a portion of each anchor platform 24. Anchor platform 24 provides a surface for the top part, if any, of an installed anchoring means 30, for example, a screw or bolt, to rest on. Each anchor platform 24 can also have an indentation around anchor holes 26 providing for a snug or flush fit of top of anchoring means 30. Anchor holes 26 are of sufficient width to accommodate the use of anchoring means 30. (FIG. 2) The length of anchoring holes 26 is the same as the maximum thickness of base 22.

Figure 5:
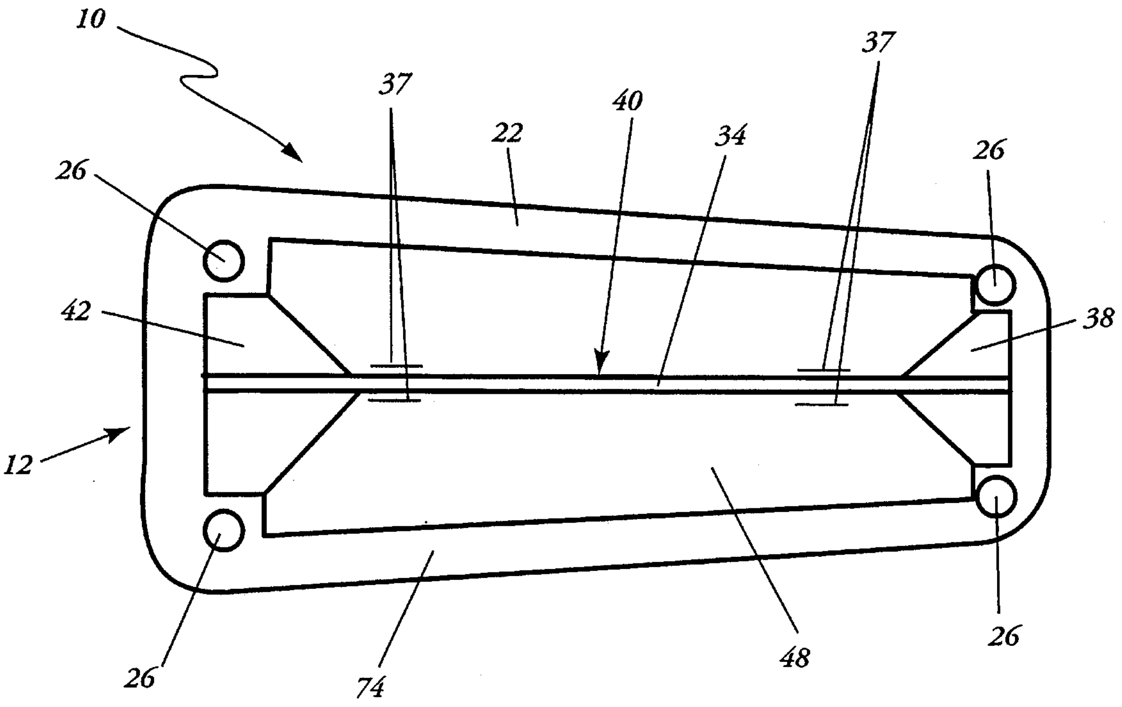
FIG. 5 is a bottom view of the street address display showing the interior of the housing.
Figure 11:
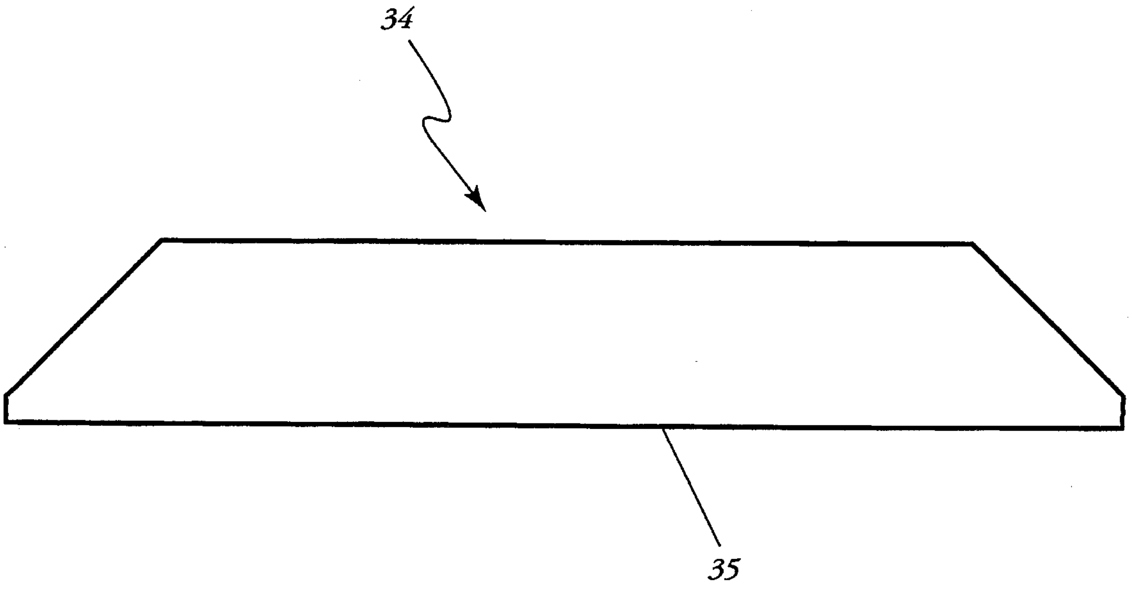
FIG. 11 is a front view of the support rib that can be used in the street address display.

Looking at FIG. 5, the figure housing 12 can be supported by an integral or separate support rib 34, which is mounted into a support rib groove 36. (FIG. 5) The support rib groove 36 is formed by a set of two parallel support groove ridges 37. In the preferred embodiment of the invention, there are five sets of support groove ridges 37. The support rib 34 runs for the length of the figure housing 12, along the inner surface 38 of the second end wall 16, along the interior surface 40 of the top 20, and along the inner surface 42 of the first end wall 18. The lower segment 35 of the support rib 34 runs along the mounting surface 52, (FIG. 2) to which the display 10 is to be mounted. The support rib 34 is depicted in FIG. 11.

Address FIGS. 46 (FIGS. 3, 6 and 7) that delineate the street address are mounted to either or both first and second viewing faces 14,15. FIGS. 46 are either light sensitive and/or reflective numbers or letters or other symbols. FIGS. 46 can be adhesive on one or both sides. FIGS. 46 can be applied to the inner surface 48 (FIG. 5) of first and second viewing face 14, 15. FIGS. 46 can also be applied to an outer surface 66 (FIG. 1) of first and second viewing faces 14, 15, but this embodiment is not preferred.

Figure 8A:
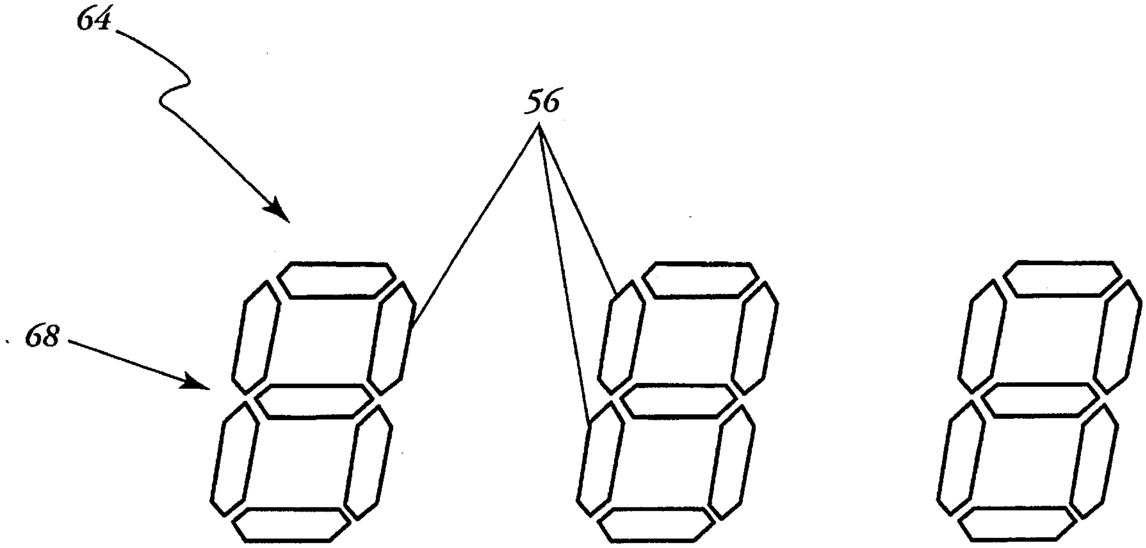
FIGS. 8A and 8B are a schematic depicting the customization of the address numeral assembly of the street address display.
Figure 8B:
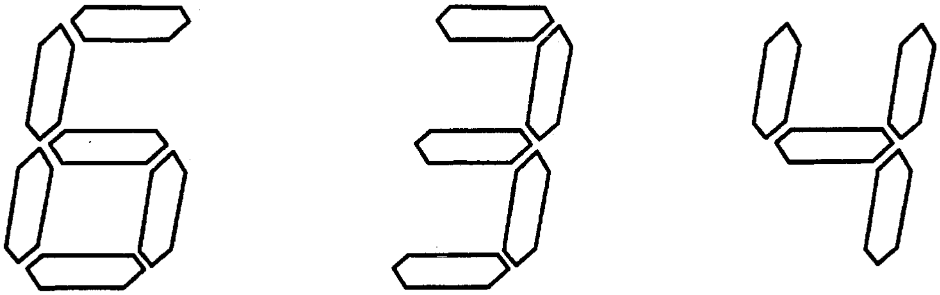

If viewing faces 14, 15 are transparent, a contrasting background material 44 can be used. The background 44 is a common self adhesive tape, or like substance, which can be non-reflective. In a preferred embodiment, address FIGS. 46 initially have the shapes of FIG. 8A defined by a plurality of removable segments 56. FIGS. 46 are applied to background 44 as follows. First, remove the backing tape of the FIGS. 46, leaving the application tape attached to FIGS. 46. Then, while keeping the application tape side facing you, reach behind the figure and remove the segments 56 of the FIG. 46 not needed. As the FIGS. 46 come in a figure-8 number sections 68 in the address numeral assembly 64, removal of the segments 56 of the particular FIG. 46 leaves the character needed for the street address, as shown by example in FIG. 8B. With the application tape facing upward, apply exposed side of FIG. 46, to the adhesive surface of background 44. Press on all parts of the FIG. 46 through the application tape firmly. Peel away the application tape.

Figure 3:
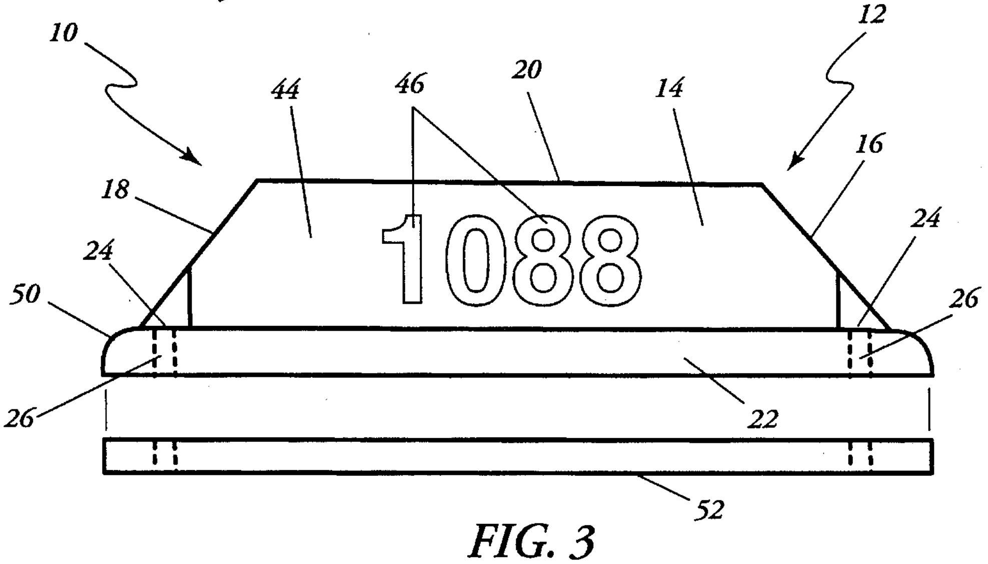
FIG. 3 is a front view of the street address display.

After mounting FIGS. 46, background 44 is mounted on the inside surface 48 of first and second viewing faces 14,15, thus placing FIGS. 46 between background 44 and inside surface 48. Background 44 is of the same size and shape of inside surface 48 of first and second viewing faces 14,15. (FIGS. 3 & 5) Preferably, background 44 is of a contrasting color to FIGS. 46. For example, background 44 could be black and FIGS. 46 could be white. When used with background 44, FIGS. 46 are of a size to fit within background 44 and are thin and flat like background 44. (FIG. 3)

Preferably, figure housing 12 is composed of a durable transparent material. In the preferred embodiment of the invention, this material is a polycarbonate. As seen in FIG. 4, the base 22 of the figure housing 12 preferably has a rounded perimeter edge 50, which is rounded in an outwardly and downwardly curving manner. (FIGS. 3–4) Lines and comers, which are formed in the molding of the figure housing 12, are rounded off on the outer surface 13 where the different parts of the figure housing 12 meet. (FIG. 2)

As seen in FIGS. 2, 3, 6 and 7, the street address display 10 is mounted directly to a mounting surface 52 such as a vehicle entranceway or a curb using anchoring platforms 24, anchoring holes 26, and anchoring means 30. The first end wall 18 is oriented towards a house or a building on the property to be identified. Thus, the second end wall 16 is oriented towards a street adjacent to the property. In this orientation, the previously described angle of the first and second viewing faces 14,15 presents the FIGS. 46 such that the FIGS. 46 effectively catch the light of oncoming headlights.

Alternatively, the street address display 10 can be mounted to the mounting surface 52 using a strong adhesive anchoring means 30, such an epoxy. The adhesive is applied to either a bottom surface 74 of the base 22, or to a point of attachment on the mounting surface 52, or both. Then, the base 22 is pressed against the mounting surface 52 at the point of attachment so that the adhesive will bond the display 10 to the mounting surface 52. In this case, anchor platforms 24, and anchor holes 26 are not utilized. In this embodiment, the anchor holes 26 can be covered with a cap or plugged. Thus, the bottom surface 74 of the base 22, along with the adhesive, serves as a means for securing the display 10 to the mounting surface 52.

Figure 9:
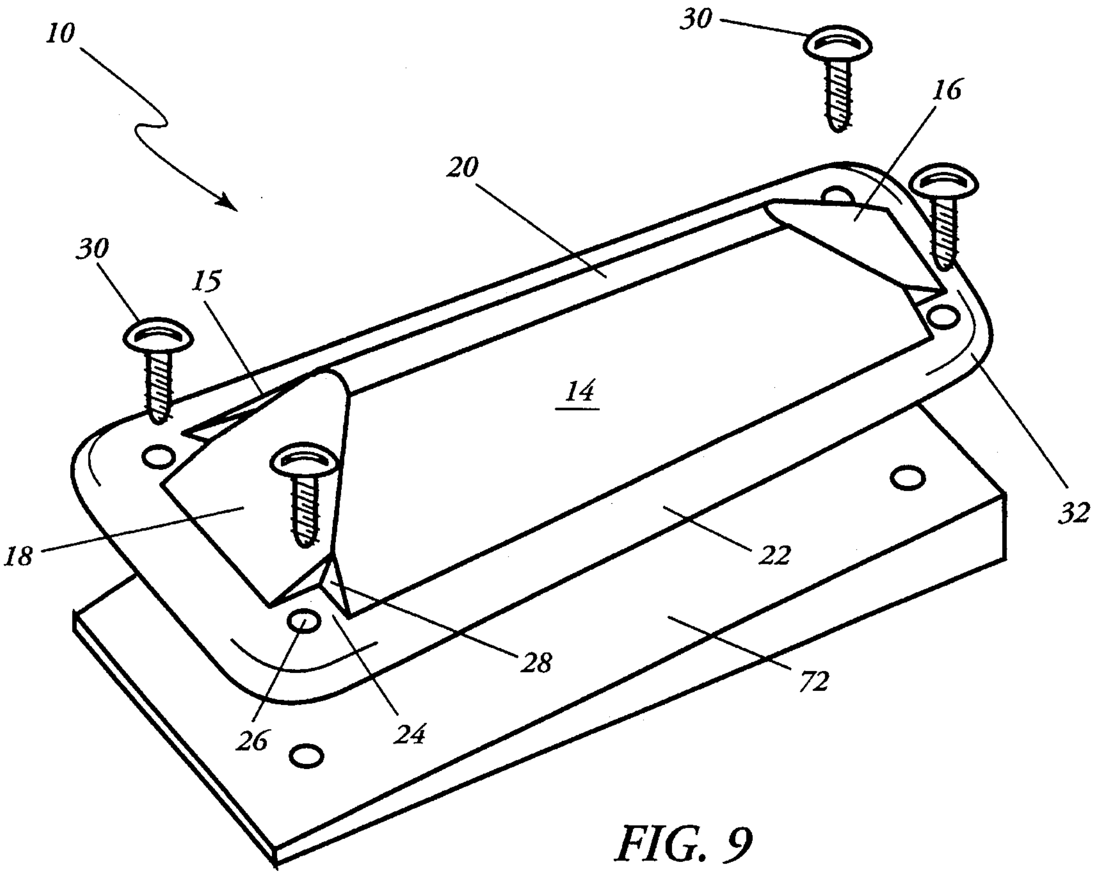
FIG. 9 is an exploded perspective view of a second embodiment of the street address display system including anchoring means and a sloped intermediate mounting platform.
Figure 10:
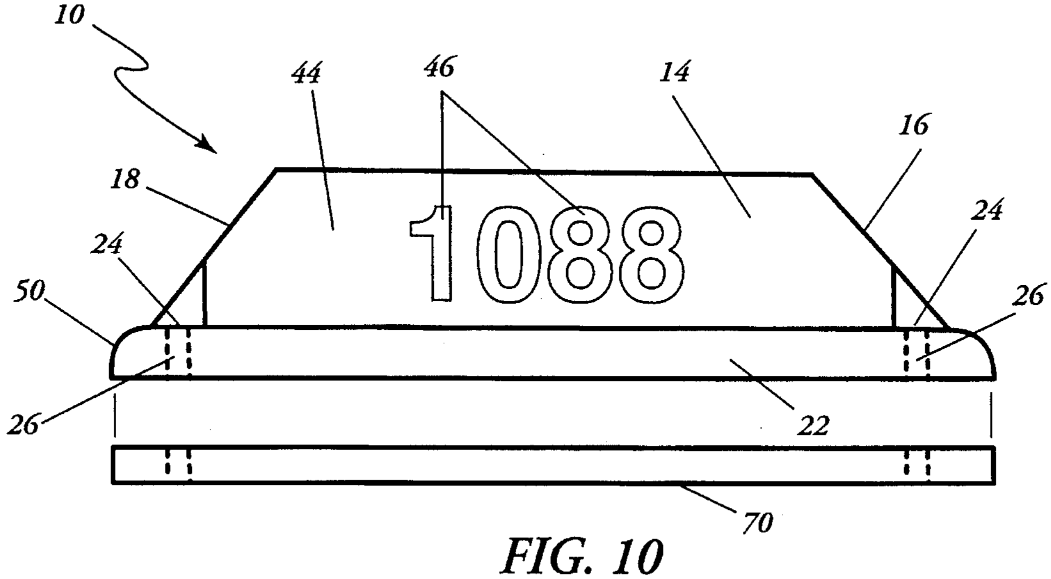
FIG. 10 is a front view of a third embodiment of the street address display, having a level intermediate mounting platform.

In a second embodiment of the display system shown on FIG. 10, the street address display 10 can be mounted through a level intermediate platform 70 or an angled intermediate platform 72 (FIG. 9) and then to mounting surface 52 if such platforms are needed to secure the display 10 to the mounting surface 52.

Figure 6:
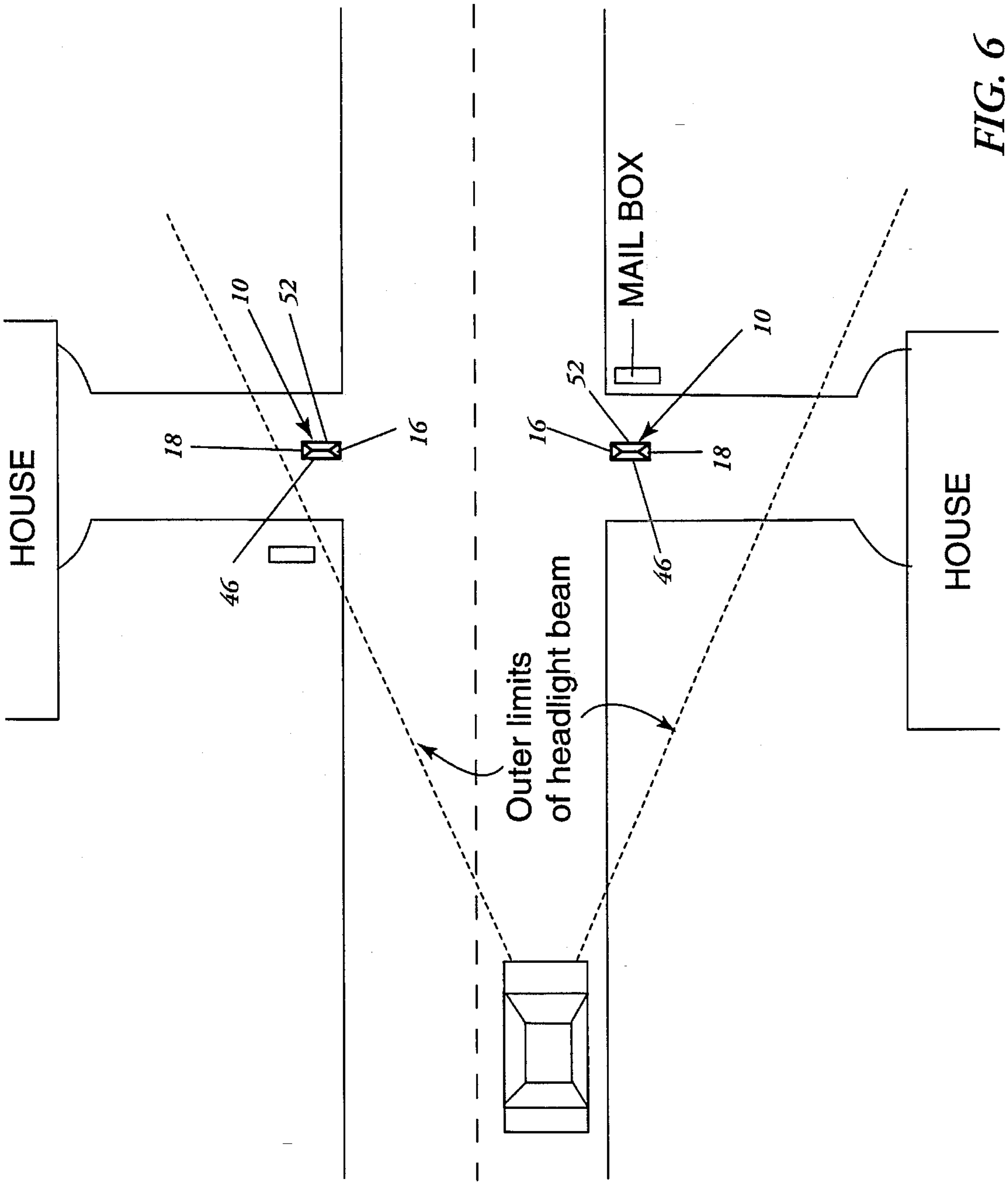
FIG. 6 is a plan view of the position and function of the street address display.
Figure 7:
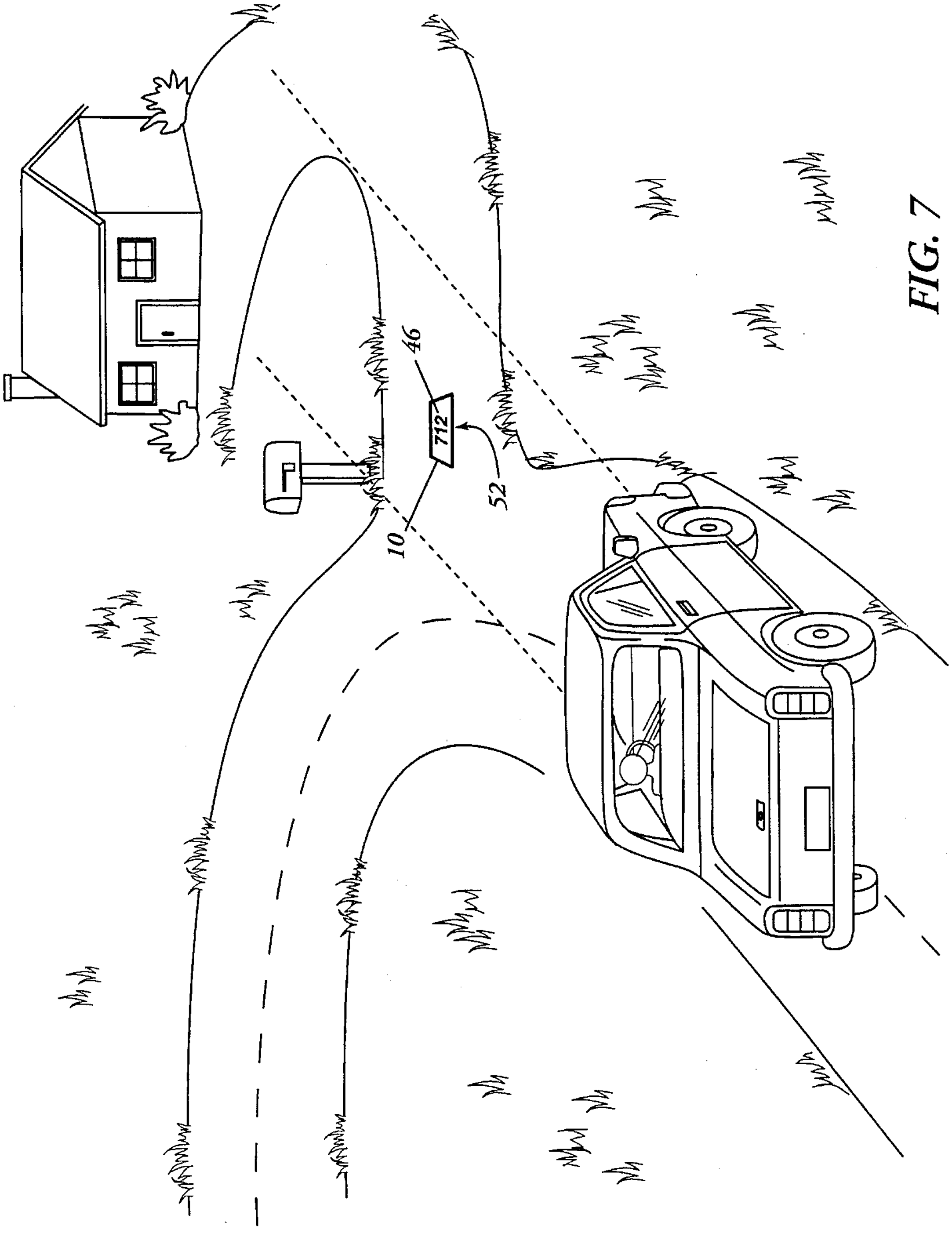
FIG. 7 is a front view of the position and function of the street address display, with darkness represented by shading.

The attachment of the street address display 10 to a mounting surface 52 such as a vehicle entranceway or curb adds to the effectiveness of the street address display 10. The street address display 10 will be mounted on the mounting surface 52 proximate to the roadway so that the street address display 10 can easily be seen from oncoming traffic. (FIGS. 6–7)

The top 20 of the street address display 10 lies sufficiently close to the mounting surface 52 to allow for unobstructed ingress and egress into the property. Since the top 20 of the street address display 10 lies close to the mounting surface 52, the FIGS. 46 are placed into the path of low beam headlights generated by a passing car. This feature allows the driver of the car to identify the property without using high beam headlights, thus avoiding the safety problems caused by the use of high beam headlights.

Additionally, the rounded outer surface 13 and durable construction of the street address display 10 allows for the street address display 10 to be impacted by entering and exiting traffic without disrupting the integrity of the street address display 10.

As customization of the street address display 10 is necessary, the previously described parts can be sold in a kit that also includes instructions on how and where to mount the display 10.

Thus, although there have been described particular embodiments of the present invention of a new and useful street address display, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A street address display for displaying a street address to a vehicle passing said display on an adjacent roadway, the vehicle having headlights with a low beam position, the headlights in the low beam position emitting a low beam having a beam illumination path with lower and upper margins, said street address display comprising:

a. a housing having first and second viewing faces, said first and second viewing faces connected at their side edges by first and second end walls, said first and second viewing faces and said first and second end walls connected along their top edges to form a top of said housing, said top of said housing extending vertically above a display mounting surface to a housing top line which is below the upper margin of the headlight beam path when the lower margin of the headlight beam path illuminates a bottom edge of said housing, said top of said housing being closer to the display mounting surface than the upper margin of the beam path, said housing top line also being proximate the display mounting surface such that said display does not obstruct vehicle ingress and egress along the mounting surface;

b. said first and second viewing faces and said first and second end walls connected along their bottom edges to a base, said base including means for securing said display to the mounting surface;

c. one or more figures, said figures used to indicate a street address, said figures attached to at least one of said first and second viewing faces; and d. a rib extending from said base beneath said first end wall along a central line of an inner surface of said first end wall along a central line of a bottom surface of said top along a central line of said second end wall to the said base beneath said second end wall.

2. The display of claim 1, wherein said first and second viewing faces taper inward from said first end wall to said second end wall.

3. The display of claim 2, said viewing faces being transparent and said figures attached to an inside surface of said viewing faces.

4. The display of claim 3 further comprising a contrasting background mounted to said viewing face adjacent to said figures.

5. The display of claim 4, wherein said figures are mounted to said contrasting background and said contrasting background is mounted to said inside surface such that said figures are located between said background and said inside surface.

6. The display of claim 1 wherein said rib has a lower segment that runs along the mounting surface.

7. The display of claim 6 wherein said rib is separate from said housing and is attached to said housing via a rib groove formed by parallel notches on said surfaces.

8. The display of claim 1, wherein said top is molded to form a curved outer surface.

9. The display of claim 1, wherein said base includes anchor platforms having anchor holes and an anchoring means, said anchoring means being inserted through said anchor holes and into the mounting surface.

10. The display of claim 9, said anchor platforms having a notch on their top surface, said notch allowing a top end of said anchoring means to fit flush with said top surface of said anchor platforms.

11. The display of claim 9, further comprising an intermediate mounting platform, said intermediate mounting platform lying between said housing and the mounting surface.

12. The display of claim 1, further comprising an adhesive, said adhesive being applied to a bottom surface of said base or to the mounting surface, or both, said display being pressed against the mounting surface so that said adhesive bonds said display to the mounting surface.

13. The display of claim 1, wherein said first and second viewing faces, said first and second end walls, and said base of said housing are formed as an integrated unit.

14. The display of claim 13, wherein said integrated unit comprises a durable transparent material.

15. The display of claim 1 wherein said first and second end walls and said first and second viewing faces taper inward from said base to said top.

16. The display described in claim 1 wherein said figures comprise a numeral assembly, said assembly comprising a plurality of number sections, each of said number sections having a plurality of segments arranged in a pattern, one or more of said segments removable by a user to leave one or more of said segments which define one or more preferred numerals selected by the user, said numeral assembly having means for adhesive attachment of said numeral assembly to a viewing face on said housing.

* * * * *